March 23, 1971  E. L. MORAGNE  3,572,305
ENGINE IGNITION INTERRUPTING SAFETY DEVICE
FOR FUEL TANK COVERS
Filed May 4, 1970
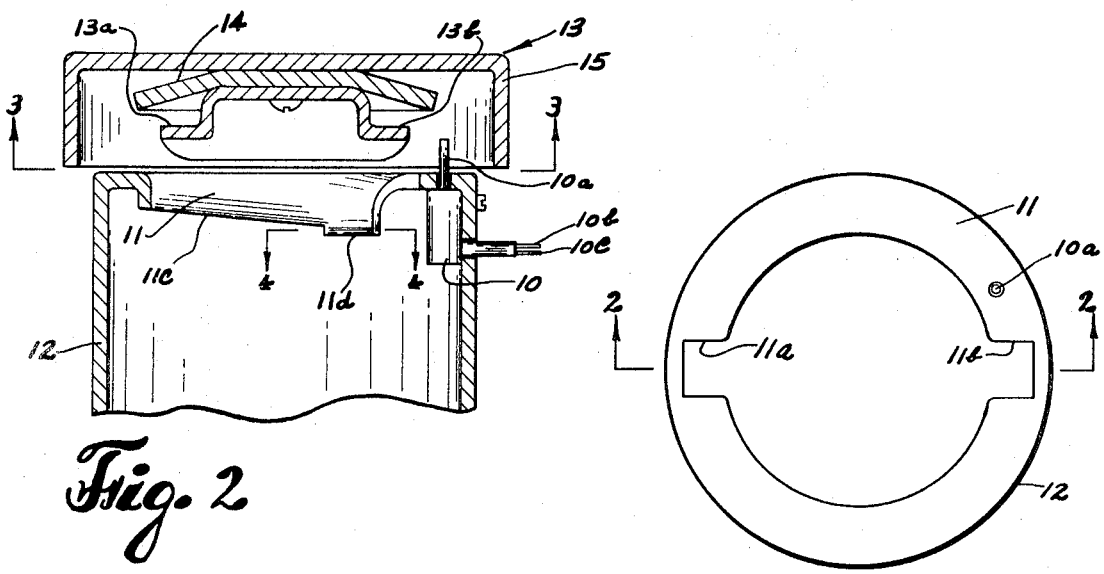
Fig. 2
Fig. 1
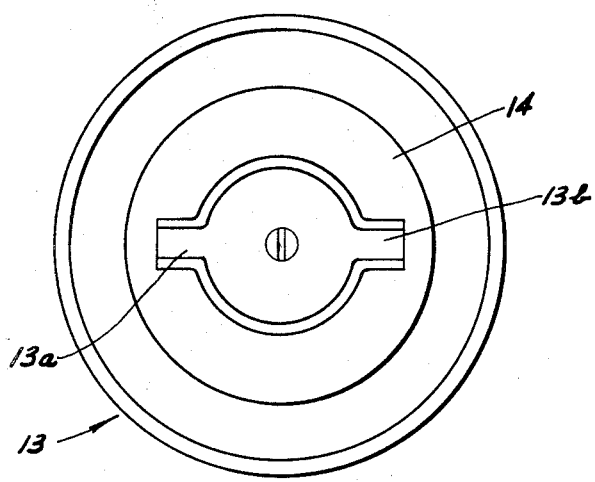
Fig. 3
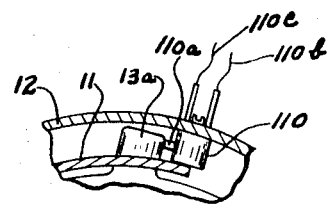
Fig. 4
EDWARD L. MORAGNE
INVENTOR.
BY
Carlos A. Torres
ATTORNEY

United States Patent Office 3,572,305
Patented Mar. 23, 1971

3,572,305
ENGINE IGNITION INTERRUPTING SAFETY DEVICE FOR FUEL TANK COVERS
Edward L. Moragne, 4723 Nenana, Houston, Tex. 77035
Filed May 4, 1970, Ser. No. 34,026
Int. Cl. B60k 15/04, 27/08; F02p 11/00
U.S. Cl. 123—146.5
6 Claims

ABSTRACT OF THE DISCLOSURE

An explosion-proof microswitch is mounted in the filling pipe leading to a gasoline storage tank. A mechanical plunger extends away from the microswitch where it is adapted to be engaged by a tank cover which is removably secured to the filler pipe opening. When the gas tank cover is in its fully closed position, the plunger of the microswitch is depressed to close an electrical circuit forming a part of the ignition circuit of an internal combustion engine. When the tank cover is off or incompletely secured to the filler pipe, the microswitch contacts are open to prevent operation of the engine.

BACKGROUND OF THE INVENTION

(1) Field of the invention

The present invention relates to safety devices employed in conjunction with internal combustion engines. More specifically, the present invention relates to an extremely simple mechanism adapted to prevent operation of an internal combustion engine when the fuel tank cover is removed from the tank filling pipe or is improperly secured to the pipe. By preventing or interrupting operation of the engine under the stated conditions, fire danger caused by loss of fuel through an open filler pipe is prevented. The system is thus effective to prevent loss of the filler pipe cap and resultant gasoline spillage and fire danger which often occurs when a service station attendant fails to replace or securely fasten the cover after fueling an automobile. In addition, the system also prevents operation of an automobile engine while the automobile is being refueled to further reduce the danger of fire. While the present invention has particular utility in the automotive field, it will be understood that the invention may be employed in any application employing a removable cover or cap to seal or enclose a container.

(2) Brief description of the prior art

The prior art has suggested a variety of devices adapted to lock a fuel tank cover into position with the locking mechanism being controlled through the ignition system of the automobile. In some cases, the lock is actuated magnetically or electrically and in others it is activated by a hydraulic linkage. Many of these prior art locking devices and systems also include means for interrupting or preventing the operation of an internal combustion engine when the fuel tank cover is removed from the tank. The one thing each of such prior art systems and devices have in common is their complexity and the typical inclusion of a locking device with the means for interrupting or preventing operation of the internal combustion engine. In addition, the prior art devices which interrupt or prevent operation of the internal combustion engine generally require elaborate modification of both the filling pipe structure, and the cooperating tank cap structure. In some designs, the means employed to activate the safety device undesirably extends into the filler pipe where it may be damaged by or form an obstruction to the nozzle of the supply line from an external gas supply pump used to fill the fuel tank.

In many cases, it is undesirable to require the use of a key to permit removing of the gas tank cap. More importantly, however, none of the prior art devices disclose a system of general utility which may be employed with little or no modification of existing filler pipe and cap structures and which may be included in new vehicles with only small or slight modification of conventional structures. The latter is of controlling interest in determining whether or not specific safety devices are to be included in new vehicles currently under production since it is a well known fact that even a relatively small modification may require a significant increase in the retail price of such vehicles.

SUMMARY OF THE INVENTION

The device of the present invention includes a self contained, explosion-proof microswitch which may be secured internally behind the lip formed at the top of a conventional filling pipe extending from a fuel storage tank. The self-contained switch includes a mechanically depressible plunger which is movable axially by the cap to make or break an electrical contact forming part of the ignition circuit of an internal combustion engine.

The safety device of the present invention may be employed by mounting the self-contained microswitch within the fuel tank filling pipe in such a position that the mechanically actuated plunger engages the gasoline tank cover and is fully depressed only when the cover is secured in proper sealing engagement with the filling pipe. The switch is mounted in an unobstructive position where it is also protected from damage by securing it internally of the filler pipe behind the inwardly developed lip formed at the top of a conventional filler pipe.

The cover may be removed from the filler cap without the need for releasing a locking mechanism to thereby eliminate a disadvantage often associated with safety devices of the type designed to prevent or halt operation of an internal combustion engine when the tank cover is removed. The switch is a readily obtainable, low cost production item which may be mounted on the tank filling pipe without modification of existing, conventional filing pipe and pipe cap structures. The switch is mounted in such a position that the switch plunger is fully depressed only when the cap is securely positioned in sealing engagement with the tank filling pipe. In the event the tank cap should become loosened, the plunger is released which permits normally open switch contacts in the microswitch to disengage which thereby opens the ignition circuit of the internal combustion engine to stop or prevent its operation.

Because of the extremely low cost and ease of installation associated with the safety device of the present invention, it is well adapted for installation in existing filler tank and cap assemblies or for installation in new vehicles. Thus, one of the principle advantages of the safety device of the present invention is the fact that conventional off-the-shelf items such as explosion-proof microswitches activated by depression of a mechanical plunger, may be employed in combination with conventional structures normally associated with automobile gas tanks and tank filler pipe caps. It will, of course, be understood that if desired, a separate locking mechanism may be included with the gas cap cover, however, one of the advantages of the present invention is its utility without the need for any separate locking mechanism which regulates removal of the cover from the tank filling pipe.

BRIEF DESCRIPTION OF THE DRAWINGS

FIG. 1 is a plan view of the top of a conventional fuel tank filling pipe;

FIG. 2 is a vertical cross-section taken along the line 2—2 of FIG. 1 and includes a cross-section of a conventional cap adapted to mate with and close the tank filling pipe;

FIG. 3 is a view taken along the line 3—3 of FIG. 2 illustrating the underside of the conventional tank cap; and FIG. 4 is a partial sectional view taken along the line 4—4 of FIG. 2 illustrating a modified form of the safety device of the present invention.

DESCRIPTION OF THE PREFERRED EMBODIMENTS

The safety device of the present invention is adapted to be employed with a conventional fuel tank filling pipe and a conventional cap, illustrated in FIGS. 1-4 of the drawings.

In the preferred form of the invention illustrated in FIG. 2, an explosion-proof microswitch 10 is mounted within the inwardly developed lip 11 of a tank filling pipe 12. It will be understood that the tank filling pipe 12 extends to a fuel tank (not illustrated) and is employed to conduct fuel from an external source to the tank. The upper portion of the lip 11 is provided with two diametrically opposed slots 11a and 11b which are adapted to receive similarly positioned cogs 13a and 13b, respectively, formed on a conventional tank cap illustrated generally at 13. The lower depending edge 11c of the lip 11 slopes downwardly from the slots 11a and 11b toward two diametrically opposed stops 11d. It will be understood that only one half of the filler tank pipe 12 is illustrated in FIG. 2, but that a similar opposing construction is present in the unillustrated half of the pipe.

The cap 13 is secured to the filling pipe 12 in a conventional manner with the cogs 13a and 13b being initially lowered into the slots 11a and 11b formed at the top of the filler pipe with the cap 13 thereafter being rotated clockwise (looking down in FIG. 2) with respect to the filler pipe in such a way that the cogs 13a and 13b engage and ride against the lower slanting edges 13c until they engage stops 11d. As the cap 13 is rotated with respect to the pipe 12, it will be understood that the cap is drawn tightly into engagement with the lip 11 of the pipe 12 drawing a resilient sealing disc 14 into sealing engagement with the top of the filling pipe.

In the preferred modification illustrated in FIG. 2 of the drawings, when the cap 13 is securely engaged with the pipe 12, a cap cover 15 bears downwardly upon a vertically positioned plunger 10a extending upwardly from the microswitch 10 through the lip 11. Depression of the switch plunger 10a closes an electrical circuit to complete electrical communication between two insulated electrical conductors 10b and 10c which extend to the ignition system of an internal combustion engine. The switch 10 is included into the ignition circuit of the engine in such a way that the engine is prevented from operating or its operation is interrupted whenever the electrical circuit between 10b and 10c is interrupted. In the preferred form of the invention, it will be understood that the plunger 10a is resiliently biased upwardly to maintain the switching contacts within the microswitch 10 in a normally open position.

An important feature in the operation of the present invention is the positioning of the plunger 10a with respect to the cover 15 in the cap 13. By means of the configuration illustrated in FIG. 2, the plunger 10a is depressed upon mating engagement by the undersurface of the cover 15 corresponding to a fully closed positioning of the cap with respect to the pipe 12. By thus positioning the plunger 10a, positive switch closing is effected only when the cap is fully closed and in proper position on the filler pipe. By contrast, if the plunger were to engage the resilient seal disc 14, it would be depressed upon contact with the disc which may or may not correspond with full closure of the cap.

FIG. 4 illustrates a modified form of the safety device of the present invention wherein a microswitch 110 is disposed with a horizontally directed plunger 110a adapted to engage the cog 13a of the cap 13 when the cap is rotated to its fully closed position. In the form of the invention illustrated in FIG. 4, it will be appreciated that the plunger 110 is in its undepressed position whenever the cog 13a is disengaged from the stop 11d formed at the lower edge of the lip 11. The form of the invention illustrated in FIG. 4 is particularly suited for cap designs having a configuration preventing the plunger from extending upwardly to engage the cap top in the manner illustrated in FIG. 2. It will be understood that the electrical leads 110b and 110c are connected into the ignition circuit of an internal combustion engine in the manner previously described.

From the foregoing it will be appreciated that the safety device of the present invention may be simply installed in existing tank and cap structures without the need for modification or elaborate changes in filler pipe and cap design except as required for mounting or securing the microswitch in position. The low cost and reliability of the microswitch employed in the present invention contributes to overall savings making the safety device desirable equipment in existing or newly manufactured equipment. Additionally, when the switch is mounted behind the internal lip of the filler cap in the manner illustrated, it is protected from damage and leaves the internal opening of the filler pipe free of obstruction.

It will be understood that, if desired, the switch may be mounted externally of the filler pipe with the plunger being depressed by the edge of the downwardly extending rim of the cap cover. The latter configuration is, however, less desirable than internal mounting of the switch since external mounting of the switch exposes it to damage. Additionally, the external mounting may require the use of a modified form of cap cover having an enlarged horizontal surface formed along the lower edge of its downwardly extending rim to ensure mating engagement between the cover and the switch plunger.

It will also be appreciated that the switch 10 or 110 may be mounted in a short, tubular adapter having the same construction as the top of the filler pipe 12 with a suitable connection means at the adapter's lower end designed to mate with a filler pipe having a structure different from that illustrated in FIGS. 1-4. By this means, the advantageous features of mounting the switch body behind a protective lip would be retained while simultaneously expanding the applicability of the invention to many non-standard filler pipe designs.

While the primary application of the present invention is in the automotive field to prevent fire and loss of the fuel tank cap, it will be appreciated that the general application of the invention is much broader. The foregoing disclosure and description of the invention is illustrative and explanatory thereof, and various changes in the size, shape and materials as well as in the details of the illustrated construction may be made within the scope of the appended claims without departing from the spirit of the invention.

What is claimed is:

1. A safety device for preventing or stopping the operation of an engine when the filler pipe cap to the tank supplying fuel to the engine is improperly closed or removed comprising:
   (a) self-contained microswitch means having a mechanically actuatable plunger operable to make or break an electrically conductive path extending through said switch means;
   (b) electrical lead means connecting said electrically conductive path in said microswitch means to the ignition circuit of the engine whereby breaking of the conductive path by said switch means prevents or stops operation of said engine;
   (c) actuating means included in said cap for moving said plunger means to complete or make the conductive path when said cap is properly closed over said filler pipe;

(d) biasing means included with said microswitch means for maintaining or moving said conductive path into open or non-conductive condition to prevent or interrupt operation of said engine when said cap is removed or is incompletely closed over said filler pipe; and (e) wherein said microswitch is mounted internally of said filler pipe between the filler pipe and an inwardly developed lip forward at the top of the filler pipe.

2. The safety device as defined in claim 1 wherein said plunger extends through said lip and is adapted to be completely depressed by said cap when said cap is in a fully closed position over said filler pipe.

3. The safety device as defined in claim 1 wherein said plunger is adapted to engage and be depressed by locking cog means extending from said cap when said cap is in fully closed position over said filler pipe.

4. The safety device as defined in claim 1 wherein said microswitch is mounted on an adapter means forming a continuation of a filler pipe whereby said device may be employed with a variety of filler pipes, and wherein said microswitch is mounted internally of said adapter means between the tubular walls of said adapter means and an inwardly developed lip formed at the top of said adapter means.

5. The safety device as defined in claim 4 wherein said plunger extends through said lip and is adapted to be completely depressed by said cap when said cap is in a fully closed position over said adapter means.

6. The safety device as defined in claim 4 wherein said plunger is adapted to engage and be depressed by locking cog means extending from said cap when said cap is in fully closed position over said adapter means.

References Cited
UNITED STATES PATENTS

| | | | |
|---|---|---|---|
| 1,788,473 | 1/1931 | Smith. | |
| 1,907,365 | 5/1933 | Prosser. | |
| 1,925,126 | 9/1933 | Winger | 123—146.5 |
| 1,986,313 | 1/1935 | Winger | 123—146.5 |
| 2,019,393 | 10/1935 | Carah | 200—61.62X |
| 2,028,515 | 1/1936 | McClanahan | 123—146.5 |
| 2,407,439 | 9/1946 | Olson | 200—61.62X |
| 2,502,580 | 4/1950 | McMillan | 123—179 |
| 2,693,588 | 11/1954 | Dawley | 200—61.62X |
| 3,026,004 | 3/1962 | Rowell | 180—103X |

AL LAWRENCE SMITH, Primary Examiner

U.S. Cl. X.R.

123—198; 180—103; 220—24; 280—5; 200—61.62, 153.19